United States Patent
Nishitani et al.

[11] Patent Number: 6,118,434
[45] Date of Patent: Sep. 12, 2000

[54] MODULE STRUCTURE

[75] Inventors: Keizo Nishitani; Shuji Takiguchi, both of Shizuoka, Japan

[73] Assignee: Yazaki Corporation, Tokyo, Japan

[21] Appl. No.: 08/886,140

[22] Filed: Jun. 30, 1997

[30] Foreign Application Priority Data

Jul. 9, 1996 [JP] Japan ..................................... 8-179456

[51] Int. Cl.⁷ ................................................. G09G 5/00
[52] U.S. Cl. .......................................... 345/173; 340/438
[58] Field of Search ..................................... 345/173, 174, 345/175, 179, 156, 157, 104; 340/461, 525, 990, 995, 438

[56] References Cited

U.S. PATENT DOCUMENTS

| 5,499,041 | 3/1996 | Brandenburg et al. | 345/174 |
| 5,859,628 | 1/1999 | Ross et al. | 345/130 |

FOREIGN PATENT DOCUMENTS

| 404284416 | 10/1992 | Japan . | |
| 8-2290 | 1/1996 | Japan | B60K 37/04 |

*Primary Examiner*—Dennis-Doon Chow
*Attorney, Agent, or Firm*—Sughrue, Mion, Zinn, Macpeak & Seas, PLLC

[57] ABSTRACT

A module structure which enables an instrument panel wire harness to have a simple construction, and in which the module can be formed into a small size, thereby reducing the number of the component parts and also enhancing the efficiency of the assembling operation. The module structure includes a panel body having a plurality of key members, a screen display device displayable a plurality of operating informations of electrical equipments, a touch panel switch feedable different switching signals based upon depression of the touch panel switch in accordance with a position of a display by the screen display device, the touch panel switch provided between the panel body and the screen display device, and a printed circuit board which has a plurality of contact portions associating with the key members, a circuit electrically connected to the screen display device, the touch panel switch and the contact portions, and a first connector electrically connected to the circuit, the first connector which is fittable to a second connector mounted in an opening formed in an instrument panel so that the module structure is detachable in the instrument panel.

2 Claims, 5 Drawing Sheets

MODULE STRUCTURE

BACKGROUND OF THE INVENTION

1. Field of the Invention

This invention relates to a module structure for arranging switches of electrical equipment and the like in an integrated manner, and more particularly to a module structure suited for use in an instrument panel of an automobile.

2. Background

A center console portion, extending to a car compartment, is provided at a central portion of an instrument panel of an automobile. Various electrical equipment, including a radio, an audio device, an air conditioner switch, a navigation device and a power seat switch, are mounted on the center console portion. These types of electrical equipment are different depending on the grade of automobiles, and therefore the procurement of the proper parts, as well as the difference in the mounting method, has been the burden on the operator. An instrument panel wire harness, passing through the center console portion, is long, and has many branch portions, and therefore the installation ability and the connector-connecting ability are poor, and also this prevents the efficiency of production of the wire harnesses from being enhanced.

In order to overcome these disadvantages, there has been proposed a center console module for arranging the above various electrical equipment in an integrated manner, the center console module including a center console portion of a single structural member. As shown in FIG. 6, the center console module 1 includes a center console panel 5 having mounting openings for mounting various electrical equipments or switches 3a, 3b, 3c and 3d, an electrical equipment cover 7, and a module wire harness 9 for connecting the electrical equipments or switches 3a, 3b, 3c and 3d to predetermined circuits.

The module wire harness 9 includes a body wire harness 9a and an A/V wire harness 9b. The body wire harness 9a and the A/V wire harness 9b have a plurality of connectors for connection to the electrical equipments or switches 3a, 3b, 3c and 3d, and wires from the plurality of connectors are connected in an integrated manner to movable-type multi-pole connectors 11a and 11b mounted respectively on ends of the body wire harness 9a and the A/V wire harness 9b.

Therefore, in the center console module 1 of this construction, the electrical equipments or switches 3a, 3b, 3c and 3d, selected in accordance with the grade, are connected using the corresponding module wire harness 9, and the center console panel 5 is mounted on an instrument panel 15, and the movable-type multi-pole connectors 11a and 11b are connected to a collecting connector 17 on the instrument panel. In this manner, the plurality of electrical equipments or switches 3a, 3b, 3c and 3d can be mounted collectively.

In the above center console module 1, however, the electrical equipments or switches 3a, 3b, 3c and 3d were merely mounted collectively on the center console panel 5, and therefore the number of the component parts, mounted on the center console panel 5, could not be reduced.

A plurality of kinds of module wire harnesses 9 have been used so that the selected electrical equipments or switches 3a, 3b, 3c and 3d could be used, and therefore each time the grade was changed, the required module wire harness 9 must be prepared, and therefore the kinds of the parts have been increased, and the standardization has been difficult.

Furthermore, in the above center console module 1, the electrical equipments or switches 3a, 3b, 3c and 3d are mounted collectively in the module, and therefore the overall size of the module is increased, and the assembling line must be changed, and the installation cost has been increased.

SUMMARY OF THE INVENTION

With the above problems in view, it is an object of this invention to provide a module structure which enables an instrument panel wire harness to be standardized with a simple construction, and in which the module can be formed into a small size, thereby reducing the number of the component parts and also enhancing the efficiency of the assembling operation.

The above object of the invention has been achieved by a module structure including: a screen display device mounted on a panel-like body; a touch panel switch for feeding different switching signals upon depression of the switch in accordance with a display position of the screen display device; a plurality of groups of switches mounted on the body; and a printed circuit board which has a circuit connected to the screen display device, the touch panel switch and the switch groups in an integrated manner, and has an external circuit-connecting connector for connecting the integrated connection circuit to an external circuit; in which the body is detachably mounted in an opening in an instrument panel, with the external circuit-connecting connector connected to a collecting connector mounted in the opening in the instrument panel.

In the module structure of this construction, the switches of the plurality of electrical equipments at the peripheral portion of the center console are gathered together at one position through the printed circuit board, and by connecting the external circuit-connecting connector, mounted on this printed circuit board, to the collecting connector on the instrument panel, these integrated switches can be collectively connected to an instrument panel wire harness. Since the switches are collectively mounted on the printed circuit board, the instrument panel wire harness can have a simple construction, and since only the switches are arranged in an integrated manner, the module can be formed into a smaller size as compared with the case where all of the electrical equipments are arranged in an integrated manner.

DETAILED DESCRIPTION OF THE PREFERRED EMBODIMENT

A preferred embodiment of a module structure of the present invention will now be described in detail with reference to the drawings.

An opening 23 is formed in a central portion of an instrument panel 21, and the module structure (center cluster module) 25 can be mounted in this opening 23.

The center cluster module 25 includes a screen (e.g. LCD) serving as a screen display device (described later), a touch panel switch for feeding different switching signals upon depression in accordance with a display position of the screen display device, and other switch groups. With the use of this center cluster module 25, the switching functions of electrical equipments, heretofore gathered together at the center console, are concentrated on this center cluster module 25.

Therefore, the plurality of electrical equipments, heretofore mounted on the center console in an integrated manner, can be arranged respectively at suitable positions. For example, a cassette tape deck and a CD player can be mounted near to the center console. Also, a cassette tape deck and a CD player having a changer function, are expected to be mounted in a trunk room or other portion in the future, and can be mounted at a position remote from the center console. The printed circuit board (described later) is provided in the center cluster module 25, and a controller for controlling the LCD, the touch panel switch and the other switch groups is mounted on the printed circuit board.

Figure 1:
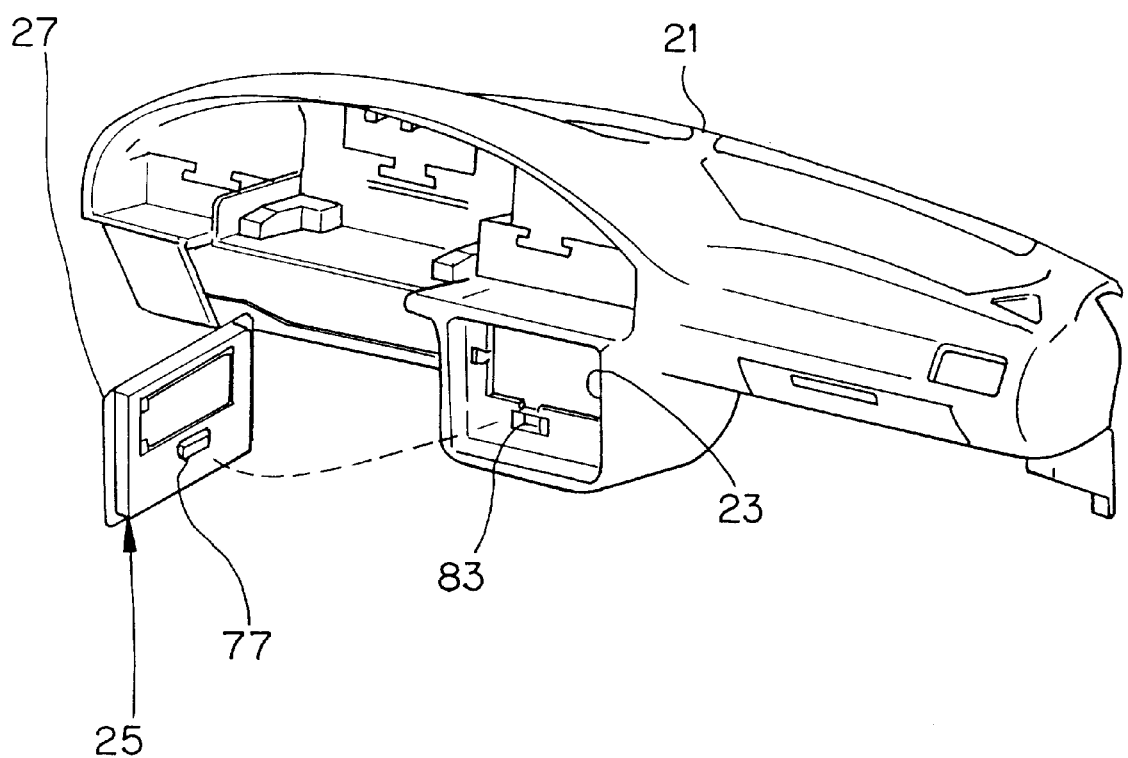
FIG. 1 is a perspective view showing an instrument panel and a module structure of the present invention.
Figure 2:
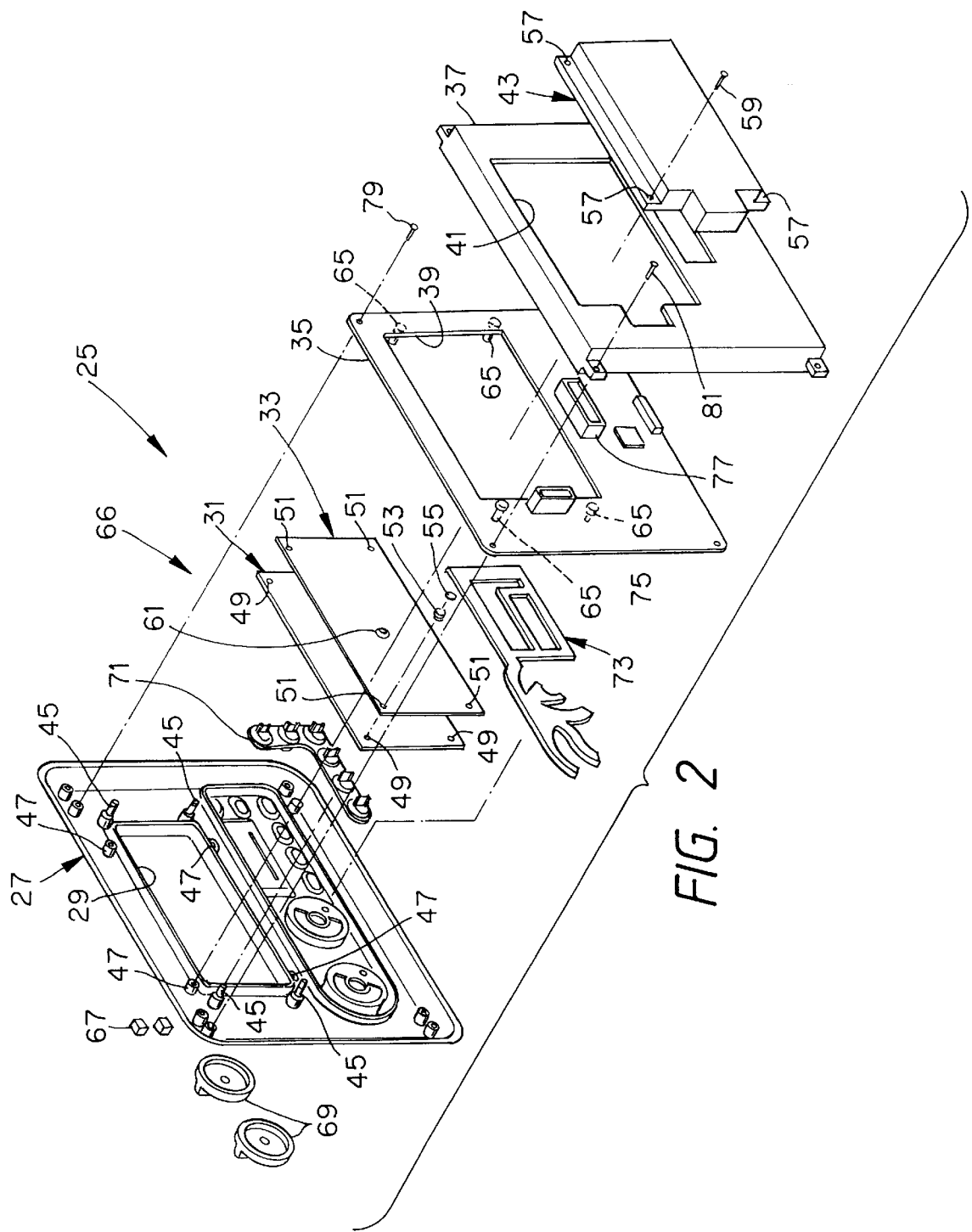
FIG. 2 is an exploded, perspective view of the module structure of FIG. 1.

As shown in FIG. 2, the center cluster module 25 includes a panel-like body (cluster panel) 27 having a window 29, and a switch plate 31 is mounted on the back side of this cluster panel. A transparent sheet 33 is mounted on the back side of the switch plate 31. The printed circuit board 35 and a cover 37 are provided at the back side of the cluster panel 27.

Windows 39 and 41 are formed respectively through the printed circuit board 35 and the cover 37, and the switch plate 31 can be mounted in these windows 39 and 41. The LCD 43, serving as the screen display device, is mounted on the back side of the transparent sheet 33 bonded to the switch plate 31.

First bosses 45 and second bosses 47 are formed on the cluster panel 27, and are disposed adjacent to corners of the window 29. Mounting holes 49 formed in the switch plate 31, as well as mounting holes 51 formed in the transparent sheet 33, are fitted on the first bosses 45, respectively. At that side of the transparent sheet 33 facing away from the switch plate 31, compression springs 53 are fitted respectively on distal ends of the first bosses 45 passing through the transparent sheet 33, and an E ring 55 is fitted on the distal end of each first boss 45 to thereby retain the compression spring 53 against disengagement.

Figure 3:
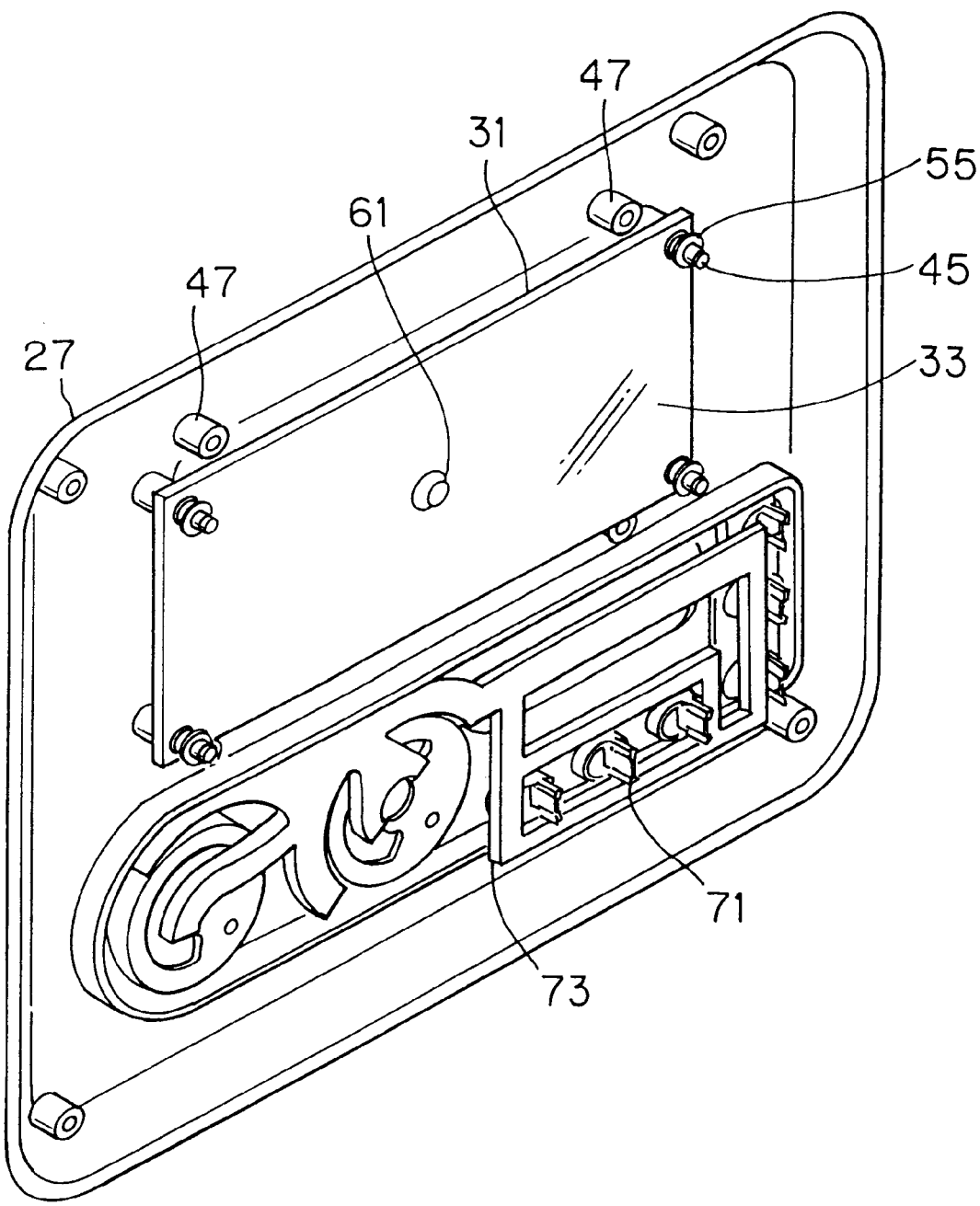
FIG. 3 is a perspective view showing a condition in which a cluster panel and a switching plate are assembled together.

Therefore, in the assembled condition shown in FIG. 3, the switch plate 31 is movable a predetermined stroke. The second bosses 47 are abutted against the LCD 43, and the LCD 43 is fixedly secured to the cluster panel by screws 59 which pass respectively through mounting holes 57 formed in the LCD 43, and are threaded respectively into screw holes formed respectively in the second bosses 47.

A projection 61 is formed on a generally central portion of the transparent sheet 33, and is abutted against the LCD 43 to serve as an axis of pivotal movement. The projection 61 includes an elastic member having a hollow portion, and an air vent hole is formed in the elastic member. Therefore, when a pressing force acts on the projection 61, the air within the projection 61 is discharged through the air vent hole, so that the projection 61 is crushed, thereby causing a feeling of this touch. When the pushing force is released, the projection 61 is elastically restored.

Figure 4:
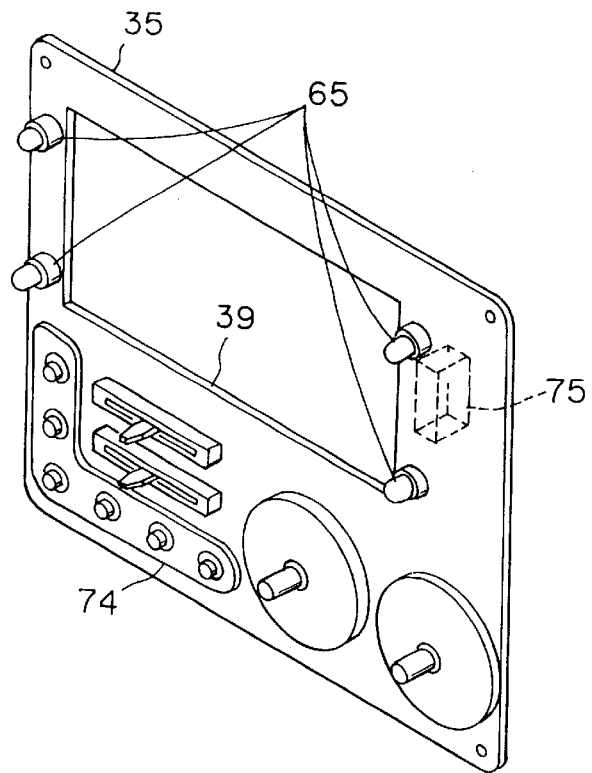
FIG. 4 is a perspective view of a printed circuit board as seen from the side of pressure sensors.

As shown in FIG. 4, the pressure sensors 65, serving as a position detection device, are provided on that side of the printed circuit board 35 facing the cluster panel 27, and are disposed adjacent respectively to corners of the window 39.

The pressure sensors 65 are abutted against the transparent sheet 33 on the switch plate 31. When the switch plate 31 is depressed, each pressure sensor 65 detects the pressure in accordance with the inclination of the switch plate 31. Namely, the touch panel switch 66 is defined by the switch plate 31, the transparent sheet 33 and the pressure sensors 65. This touch panel switch 66 can be used, for example, for feeding switch operating signals for a radio, an audio device, a navigation device and a power switch seat.

The plurality of groups of switches, including temperature control key tops 67, rotary switch key tops 69 and a mode change switch assembly 71, are mounted on the cluster panel 27. A light-conducting plate 73 is mounted on the cluster panel 27. Rubber contacts 74, corresponding to the mode change switch assembly 71, a LCD-connecting connector 75, and wire harness joints for an earth wire and an illumination circuit (not shown) are mounted on the printed circuit board 35.

A circuit connected to the LCD 43, the pressure sensors 65, the groups of switches 67, 69 and 71 and the LCD-connecting connector 75 in an integrated manner is formed on the printed circuit board 35. This circuit is connected to an instrument panel wire harness-connecting connector (external circuit-connecting connector) 77. The printed circuit board 35 is secured to the cluster panel 27 by screws 79, and the cover 37 is secured to the cluster panel 27 by screws 81.

The operation of the center cluster module 25 will now be described.

The center cluster module 25 is mounted in the opening 23 in the instrument panel 21, with the instrument panel wire harness-connecting connector 77 connected to a collecting connector 83 provided in the opening 23. The center cluster module 25, connected to the collecting connector 83, feeds switching signals, fed from the touch panel 66 and the plurality of groups of switches 67, 69 and 71, to the respective electrical equipments.

Figure 5:
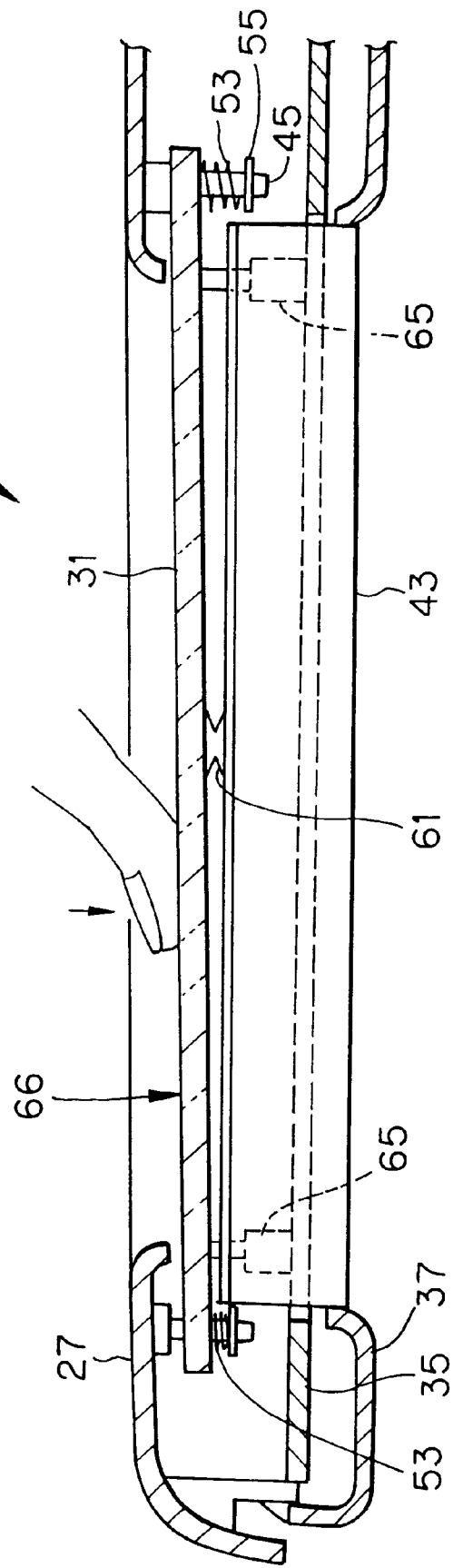
FIG. 5 is a cross-sectional view of an important portion, showing the operation of the touch panel switch.

When a pushing force is not applied to the switch plate 31, the touch panel switch 66 is urged upward (in FIG. 5) by the compression springs 53. In this case, the pressure, detected by the pressure sensors 65, is "0", and the projection 61 on the switch plate 31 is not crushed.

Various kinds of operating informations are displayed on the LCD 43, and when a desired position or portion of the switch plate 31 is depressed in accordance with the display position of the LCD 43, the switch plate 31 is inclined about the projection 61 against the bias of the compression springs 53. As a result, the pressure sensors 65 are pressed down by the depressed portion of the switch plate 31, and the pressure sensors 65 detect the pressures, respectively, in accordance with the amount of depression of the switch plate 31. Then, by comparing the amounts of displacement of the pressure sensors, the depressed position or portion of the switch plate 31 is detected using X-Y coordinates, and the switching signal, corresponding to the depressed position, is fed, so that the selected switching operation is effected.

When other switching group, for example, the mode change switch assembly 71 is operated, the rubber contact 74 corresponding to the operated key top is closed and opened, thereby feeding the switching signal to the printed circuit board 35, so that the selected switching operation is effected.

In the above center cluster module 25, all of the electrical equipments are not mounted at the peripheral portion of the center console in an integrated manner, but the switches of these electrical equipments are collectively connected to the collecting connector 83 on the instrument panel 21 through the instrument panel wire harness-connecting connector 77. Therefore, as compared with the conventional center console module in which all of the electrical equipments are arranged in an integrated manner, the module can be formed into a smaller size, and the instrument panel harness can be standardized with a simple construction.

Figure 6:
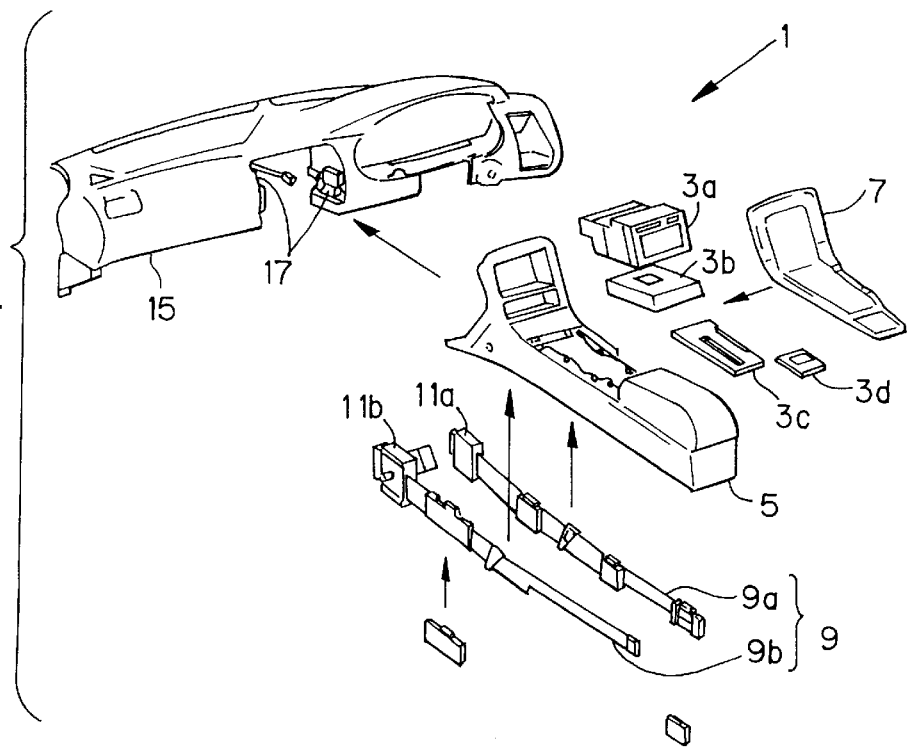
FIG. 6 is an exploded, perspective view of a conventional center console module.

And besides, since the center cluster module 25 is mounted in the opening 23 in the instrument panel 21, the electrical equipment cover 7 (see FIG. 6), required when mounting a plurality of electrical equipments on the conventional center console, is unnecessary.

Furthermore, the separate touch panel switch 66 and the separate LCD 43 are mounted on the center cluster module 25 of the above embodiment, and therefore the maintenance ability is enhanced, for example, when exchanging the LCD 43.

With the use of the center cluster module 25, a number of switches of the electrical equipments, which have heretofore been mounted at different positions, can be arranged in a concentrated manner, and the safety is enhanced when operating the switches.

In the center cluster module 24, in addition to the controller for controlling the LCD 43, the touch panel switch 66 and the switch groups 67, 69 and 71, a multiple controller, compatible with an internal LAN, can be mounted on the printed circuit board 35.

As described above in detail, in the module structure of the present invention, the switches of the electrical equipments are collectively mounted at the peripheral portion of the center console, and the external circuit-connecting connector is connected to the collecting connector on the instrument panel, and with this construction, these switches can be collectively connected to the instrument panel wire harness. Therefore, as compared with the conventional center console module in which all of the electrical equipments are arranged in an integrated manner, the module can be formed into a smaller size, and besides the instrument panel wire harness can be standardized with the simple construction. As a result, the number of the components parts can be reduced, and the efficiency of the assembling operation can be enhanced.

What is claimed is:

1. A module structure comprising:

a panel body having a plurality of key members;

a screen display device displaying information of electrical equipment;

a touch panel switch for feeding different switching signals based upon depression of the touch panel switch in accordance with a position of a display by the screen display device, the touch panel switch provided between the panel body and the screen display device; and a printed circuit board which has a plurality of contact portions associating with the key members, a circuit electrically connected to the screen display device, the touch panel switch and the contact portions, and a first connector electrically connected to the circuit, the first connector which is fittable to a second connector mounted in an opening formed in an instrument panel so that the module structure is detachable in the instrument panel, wherein the touch panel switch comprising a switch plate and a transparent sheet provided between the screen display device and the switch plate, the transparent sheet including a project portion which has an elastic member having a hollow portion, and an air vent hole formed in the elastic member.

2. The module structure of claim 1, wherein the touch panel switch including a position detection device provided on a side surface of the printed circuit board so as to be abutted against the transparent sheet.

* * * * *